US011843344B2

(12) United States Patent
Chang

(10) Patent No.: US 11,843,344 B2
(45) Date of Patent: Dec. 12, 2023

(54) BRUSHLESS DC ELECTRIC (BLDC) MOTOR DRIVER CIRCUIT

(71) Applicant: RICHTEK TECHNOLOGY CORPORATION, Zhubei (TW)

(72) Inventor: Wei-Hsu Chang, New Taipei (TW)

(73) Assignee: RICHTEK TECHNOLOGY CORPORATIION, Zhubei (TW)

( * ) Notice: Subject to any disclaimer, the term of this patent is extended or adjusted under 35 U.S.C. 154(b) by 147 days.

(21) Appl. No.: 17/511,631

(22) Filed: Oct. 27, 2021

(65) Prior Publication Data

US 2022/0140758 A1     May 5, 2022

Related U.S. Application Data

(60) Provisional application No. 63/108,456, filed on Nov. 2, 2020.

(30) Foreign Application Priority Data

May 5, 2021   (TW) .................................. 110116286

(51) Int. Cl.
   *H02P 6/12*     (2006.01)
   *H02P 6/08*     (2016.01)

(52) U.S. Cl.
   CPC . *H02P 6/12* (2013.01); *H02P 6/08* (2013.01)

(58) Field of Classification Search
   CPC ..................................... H02P 6/12; H02P 6/08

USPC ........................................................ 318/400.08
   See application file for complete search history.

(56) References Cited

U.S. PATENT DOCUMENTS

| | | | | |
|---|---|---|---|---|
| 2015/0175193 | A1* | 6/2015 | Endo | ..................... B62D 5/0481 701/29.2 |
| 2021/0213593 | A1* | 7/2021 | Ichikawa | ................. B25B 21/02 |
| 2022/0268904 | A1* | 8/2022 | Zhao | .......................... G01S 7/40 |

FOREIGN PATENT DOCUMENTS

| | | |
|---|---|---|
| CN | 205304653 U | 6/2016 |
| TW | 201509112 A | 3/2015 |

OTHER PUBLICATIONS

JP 6340384 B2 "Unmanned Aerial Vehicle" Date Published Jun. 6, 2018 (Year: 2018).*

* cited by examiner

*Primary Examiner* — Jorge L Carrasquillo
(74) *Attorney, Agent, or Firm* — Tung & Associates

(57) ABSTRACT

A brushless DC electric (BLDC) motor driver circuit includes: a power stage circuit configured to operably drive a brushless DC electric (BLDC) motor according to a pulse width modulation (PWM) signal; and an abnormality diagnosis circuit, wherein when a first parameter is under control, the abnormality diagnosis circuit is configured to operably determine a rotation abnormality condition of the BLDC motor according to a second parameter; wherein the first parameter and the second parameter are correlated with the rotation of the BLDC motor.

14 Claims, 6 Drawing Sheets

BRUSHLESS DC ELECTRIC (BLDC) MOTOR DRIVER CIRCUIT

CROSS REFERENCE

The present invention claims priority to U.S. 63/108,456 filed on Nov. 2, 2020 and claims priority to TW 110116286 filed on May 5, 2021.

BACKGROUND OF THE INVENTION

Field of Invention

The present invention relates to a brushless DC electric (BLDC) motor driver circuit; particularly, it relates to such BLDC motor driver circuit capable of detecting abnormal rotation in a BLDC motor.

Description of Related Art

Brushless DC electric (BLDC) motors are widely used in many applications. FIG. 1 shows a schematic block diagram of a conventional BLDC motor driver circuit. The conventional BLDC motor driver circuit 101 shown in FIG. 1 receives signals issued from an external host 103, and drive a BLDC motor 102 accordingly. This conventional BLDC motor driver circuit 101 provides protection mechanisms such as over-current protection, over-voltage protection, over-temperature protection, etc., for protecting the power stage circuit therein from undesirable situations such as over-current over-voltage, under-voltage, over-temperature, etc. However, the prior art shown in FIG. 1 has the following drawbacks that: long-term operation may lead to aging or malfunction of the mechanical devices of the BLDC motor 102, such as malfunctioning bearing or broken fan. In current state of the art, such degradation or malfunction cannot be detected.

In view of the above, to overcome the drawbacks in the prior art, the present invention proposes an innovative brushless DC electric (BLDC) motor driver circuit.

SUMMARY OF THE INVENTION

From one perspective, the present invention provides a brushless DC electric (BLDC) motor driver circuit, comprising: a power stage circuit, which is configured to operably drive a BLDC motor according to a pulse width modulation (PWM) signal; and an abnormality diagnosis circuit, wherein when a first parameter is under control the abnormality diagnosis circuit is configured to operably determine a rotation abnormality condition of the BLDC motor according to a second parameter; wherein the first parameter and the second parameter are correlated with a rotation of the BLDC motor.

In one embodiment, the first parameter includes at least one of the following motor parameters, whereas, the second parameter includes at least another one of the following motor parameters: (1) a rotation speed of the BLDC motor; (2) a temperature of the BLDC motor; (3) an ambient temperature; (4) an input current of the BLDC motor; (5) an input voltage of the BLDC motor; and/or (6) a duty ratio of the PWM signal; wherein the first parameter is different from the second parameter.

In one embodiment, when the first parameter is controlled at a predetermined constant, the abnormality diagnosis circuit is configured to operably determine the rotation abnormality condition of the BLDC motor according to whether the second parameter exceeds a predetermined parameter range.

In one embodiment, the motor parameter is detected or estimated by a corresponding parameter detection device.

In one embodiment, the parameter detection device includes at least one of the following: (1) a rotation speed detection device, which is configured to operably detect the rotation speed of the BLDC motor; (2) a BLDC motor temperature detection device, which is configured to operably detect the temperature of the BLDC motor; (3) an ambient temperature detection device, which is configured to operably detect the ambient temperature; (4) a current detection device, which is configured to operably detect the input current of the BLDC motor; (5) a voltage detection device, which is configured to operably detect the input voltage of the BLDC motor; and/or (6) a rotation speed estimation device, which is configured to operably estimate the rotation speed of the BLDC motor.

In one embodiment, the predetermined parameter range corresponding to the second parameter is correlated with the another one of the motor parameters.

In one embodiment, when the first parameter is the rotation speed of the BLDC motor, the BLDC motor driver circuit further comprises: a rotation speed detection device and a rotation speed control device, wherein the rotation speed detection device is configured to operably detect the rotation speed of the BLDC motor, and wherein the rotation speed control device is configured to operably control the rotation speed of the BLDC motor to become a constant according to a reference rotation speed and the rotation speed of the BLDC motor fed back by the rotation speed detection device.

In one embodiment, the predetermined parameter range is stored in the power stage circuit or the abnormality diagnosis circuit, or wherein the predetermined parameter range is set via a plurality of external pins or an external host.

In one embodiment, the BLDC motor driver circuit is coupled to the external host via an interface, wherein the interface includes: a communication bus or a plurality of dedicated pins.

In one embodiment, the BLDC motor driver circuit further comprises: a commutation and PWM control circuit, which is configured to operably generate the PWM signal according to a rotor angle and the duty ratio of the PWM signal.

In one embodiment, the BLDC motor driver circuit further comprises: a rotation speed control device, which is configured to operably generate the duty ratio of the PWM signal according to a difference between a reference rotation speed and the rotation speed of the BLDC motor.

In one embodiment, the first parameter is the duty ratio of the PWM signal, whereas, the second parameter is the rotation speed of the BLDC motor.

In one embodiment, the first parameter is the duty ratio of the PWM signal, whereas, the second parameter is the temperature of the BLDC motor and/or the ambient temperature.

In one embodiment, the first parameter is the input current of the BLDC motor, whereas, the second parameter is the rotation speed of the BLDC motor.

In one embodiment, the first parameter is the input current of the BLDC motor, whereas, the second parameter is the temperature of the BLDC motor and/or the ambient temperature.

Advantages of the present invention include: that the present invention can diagnose whether a mechanical malfunction occurs in the BLDC motor by monitoring the duty ratio of the PWM signal, the rotation speed of the BLDC motor, the input current of the BLDC motor, the input voltage of the BLDC motor, the temperature of the BLDC motor and/or the ambient temperature; and that the present invention can issue an alarm or report an error concerning a condition of the BLDC motor to an external host.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
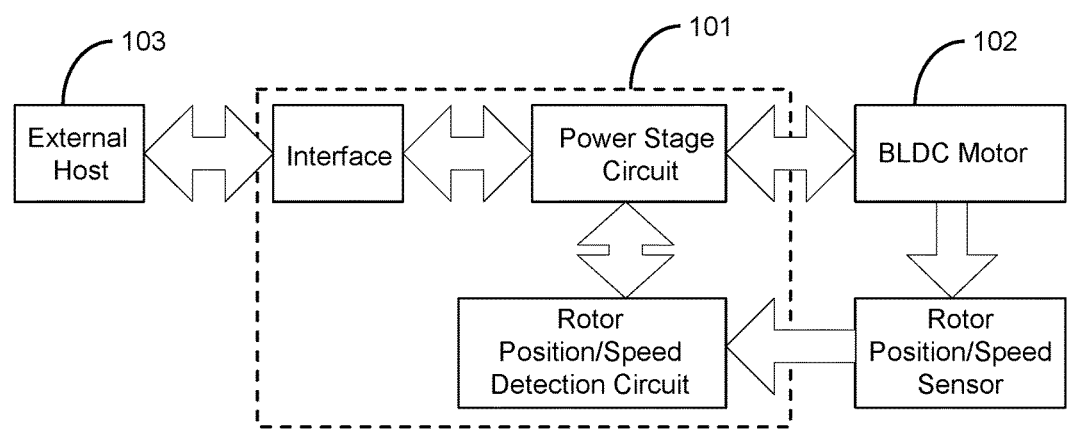
FIG. 1 shows a schematic block diagram of a conventional BLDC motor driver circuit.
Figure 2A:
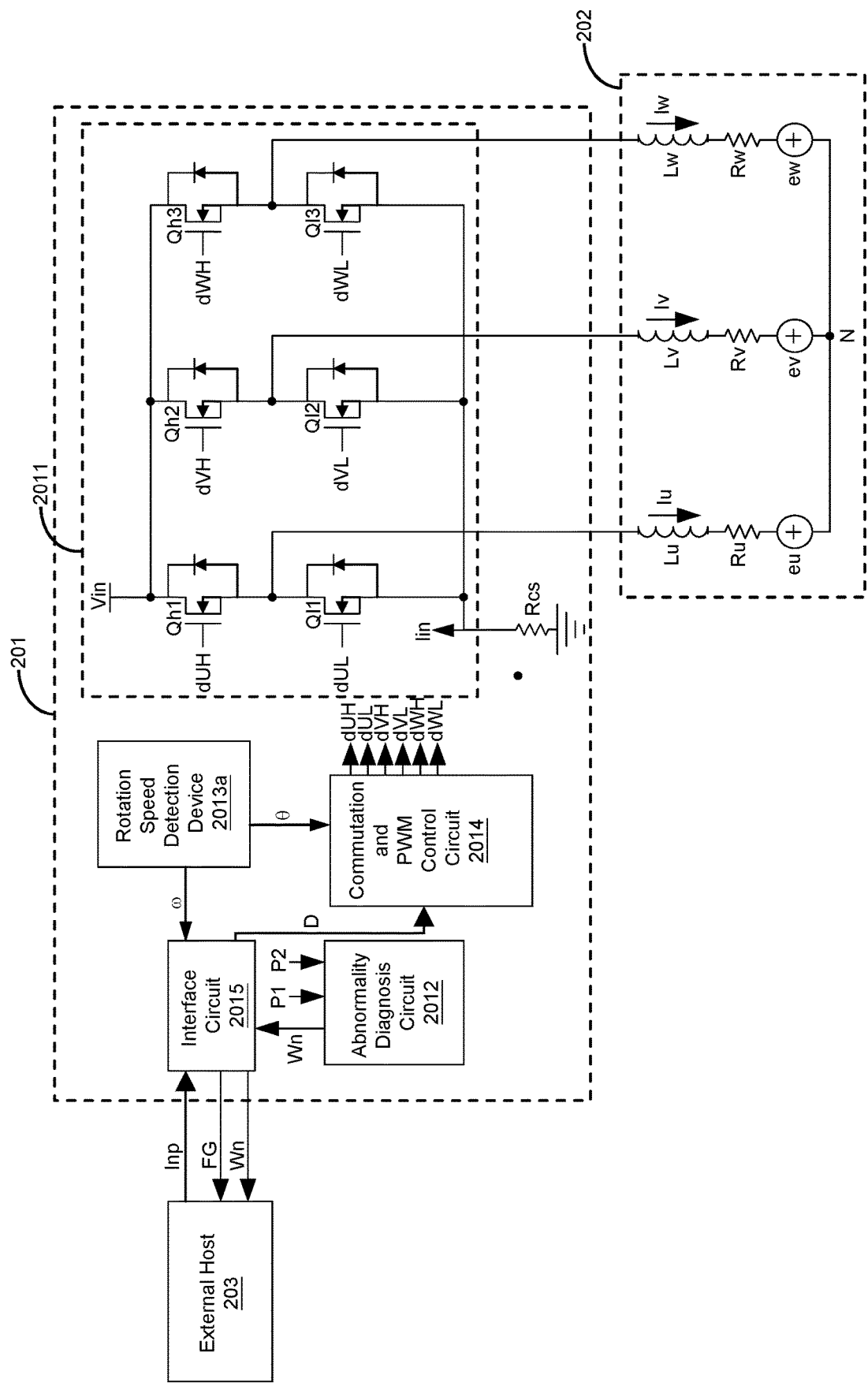
FIG. 2A shows a schematic circuit diagram of a BLDC motor driver circuit according to an embodiment of the present invention.

Please refer to FIG. 2A, which shows a schematic circuit diagram of a BLDC motor driver circuit 201 according to an embodiment of the present invention. As shown in FIG. 2A, the BLDC motor driver circuit 201 comprises: a power stage circuit 2011, an abnormality diagnosis circuit 2012, a rotation speed detection device 2013a, a commutation and pulse width modulation (PWM) control circuit 2014 and an interface circuit 2015.

The power stage circuit 2011 is configured to operably drive a BLDC motor 202 according to pulse width modulation (PWM) signals dUH, dUL, dVH, dVL, dWH and dWL. The power stage circuit 2011 is coupled to the commutation and PWM control circuit 2014. The abnormality diagnosis circuit 2012 is configured to operably determine a rotation abnormality condition of the BLDC motor 202 according to a second parameter P2 in a case where a first parameter P1 is under control. The abnormality diagnosis circuit 2012 is coupled to the interface circuit 2015. When the abnormality diagnosis circuit 2012 determines that a rotation abnormality occurs in the BLDC motor 202, the abnormality diagnosis circuit 2012 will issue an abnormality alarm signal Wn to the interface circuit 2015. In one embodiment, the first parameter P1 and the second parameter P2 are correlated with the rotation of the BLDC motor 202. In one embodiment, in a case where the first parameter P1 is controlled at a predetermined constant, the abnormality diagnosis circuit 2012 is configured to operably determine the rotation abnormality condition of the BLDC motor 202 according to whether the second parameter P2 exceeds a predetermined parameter range. In one embodiment, the predetermined parameter range is stored in the power stage circuit 2011 or the abnormality diagnosis circuit 2012, or the predetermined parameter range is set via external pins or an external host 203. In one embodiment, the first parameter P1 can be controlled at the predetermined constant via feedback mechanism of the BLDC motor driver circuit 201 (in this case the first parameter P1 can be, for example but not limited to, the rotation speed ω of the BLDC motor 202); in another embodiment, the first parameter P1 can be controlled at the predetermined constant according to a demanding signal from the abnormality diagnosis circuit 2012 (in this case the first parameter P1 can be, for example but not limited to, the temperature Tm of the BLDC motor 202).

As shown in FIG. 2A, the rotation speed detection device 2013a is configured to operably detect the rotation speed ω of the BLDC motor 202 and the rotation angle θ of the BLDC motor 202. The rotation speed detection device 2013a is coupled to the commutation and PWM control circuit 2014 and the interface circuit 2015, to transmit the rotation angle θ of the BLDC motor 202 to the commutation and PWM control circuit 2014 and transmit the rotation speed ω of the BLDC motor 202 to the interface circuit 2015. The BLDC motor driver circuit 201 is coupled to the external host 203 via an interface. In one embodiment, the interface includes a communication bus or dedicated pins (e.g., pin FG). In one embodiment, the interface circuit 2015 is configured to operably receive the PWM signal Inp, to retrieve a duty ratio from the PWM signal Inp, and the interface circuit 2015 transmits the duty ratio to the commutation and PWM control circuit 2014. In addition, the interface circuit 2015 is configured to operably transmit the abnormality alarm signal Wn generated from the abnormality diagnosis circuit 2012 to the external host 203. The interface circuit 2015 is coupled to the external host 203. The commutation and PWM control circuit 2014 is configured to operably generate the PWM signals dUH, dUL, dVH, dVL, dWH and dWL according to the rotor angle θ and the duty ratio D of the PWM signal Inp. The commutation and PWM control circuit 2014 is coupled to the rotation speed detection device 2013a, the power stage circuit 2011 and the interface circuit 2015. As shown in FIG. 2A, the BLDC motor 202 has plural coils. In one embodiment as shown by FIG. 2A, the BLDC motor 202 is implemented as a three-phase BLDC motor, having a U-phase coil, a V-phase coil, and a W-phase coil. It should be understood that the implementation of the BLDC motor 202 as a three-phase BLDC motor in the embodiment shown in FIG. 2A is only an illustrative example, but not for limiting the broadest scope of the present invention. In other embodiments, it is also practicable and within the scope of the present invention that the BLDC motor 202 can be implemented as a 2-phase BLDC motor, a 5-phase BLDC motor or any other type of plural phase BLDC motor.

In one embodiment, the first parameter P1 includes at least one of the following motor parameters whereas, the second parameter P2 includes at least another one of the following motor parameters: (1) the rotation speed ω of the BLDC motor 202; (2) the temperature Tm of the BLDC motor 202; (3) the ambient temperature Te; (4) the input current Iin of the BLDC motor 202; (5) the input voltage Vin of the BLDC motor 202; and/or (6) the duty ratio D of the PWM signal Inp. In one embodiment, the first parameter P1 is different from the second parameter P2. For example, in a case where the first parameter P1 is the rotation speed ω of the BLDC motor 202, the second parameter P2 can be at least one of the following: the temperature Tm of the BLDC motor 202; the ambient temperature Te; the input current Iin of the BLDC motor 202; the input voltage Vin of the BLDC motor 202; and/or the duty ratio D of the PWM signal Inp. For another example, in a case where the first parameter P1 is the temperature Tm of the BLDC motor 202, the second parameter P2 can be at least one of the following: the rotation speed ω of the BLDC motor 202; the ambient temperature Te; the input current Iin of the BLDC motor 202; the input voltage Vin of the BLDC motor 202; and/or the duty ratio D of the PWM signal Inp. In a case where the first parameter P1 is the temperature Tm of the BLDC motor 202 and the ambient temperature Te, the second parameter P2 can be at least one of the following: the rotation speed ω of the BLDC motor 202; the input current Iin of the BLDC motor 202; the input voltage Vin of the BLDC motor 202; and/or the duty ratio D of the PWM signal Inp. The above examples are given for illustration; other implementations are also practicable within the spirit of the present invention.

In one embodiment, the predetermined parameter range corresponding to the second parameter P2 is correlated with at least one of the motor parameters. The aforementioned predetermined parameter range can be, for example but not limited to, a maximum rotation speed (ωM) of the BLDC motor 202, a minimum rotation speed (ωm) of the BLDC motor 202, a maximum input current (IinM) of the BLDC motor 202, a minimum input current (Iinm) of the BLDC motor 202, a maximum input voltage (VinM) of the BLDC motor 202, a minimum input voltage (Vinm) of the BLDC motor 202, a maximum temperature (TmM) of the BLDC motor 202, a minimum temperature (Tmm) of the BLDC motor 202, a maximum ambient temperature (TeM), a minimum ambient temperature (Tem), a maximum duty ratio (DM) of the PWM signal Inp and/or a minimum duty ratio (Dm) of the PWM signal Inp. For example, in one embodiment, the predetermined parameter range corresponding to the duty ratio D of the PWM signal Inp can be set according to one of the following parameters: the rotation speed ω of the BLDC motor 202; the temperature Tm of the BLDC motor 202; the ambient temperature Te; the input current Iin of the BLDC motor 202; an input voltage Vin of the BLDC motor 202; and/or the duty ratio D of the PWM signal Inp. For another example, in one embodiment, the predetermined parameter range corresponding to the rotation speed ω of the BLDC motor 202 can be set according to one of the following parameters: the rotation speed ω of the BLDC motor 202; the temperature Tm of the BLDC motor 202; the ambient temperature Te; the input current Iin of the BLDC motor 202; the input voltage Vin of the BLDC motor 202; and/or the duty ratio D of the PWM signal Inp. The above examples are given for illustration; other implementations are also practicable within the spirit of the present invention.

Figure 2B:
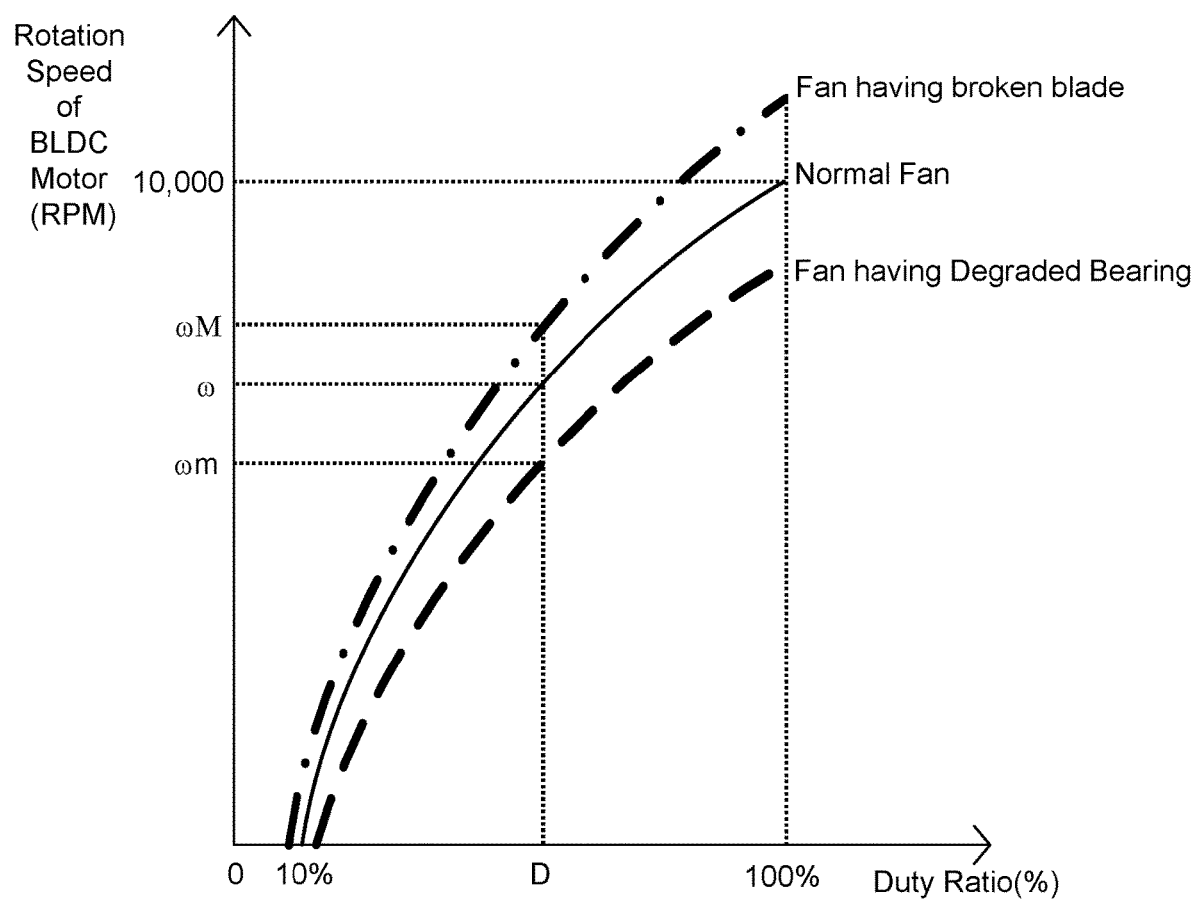
FIG. 2B shows a characteristic curve of the BLDC motor driver circuit of the present invention.

In another embodiment, the predetermined parameter range corresponding to the duty ratio D of the PWM signal Inp can be determined from a characteristic curve of the duty ratio D of the PWM signal Inp versus one of the following parameters, wherein the range is expanding the curve by a constant difference/percentage (i.e., when the duty ratio D is a number in the curve, the range of the corresponding parameter is a range expanding from the curve by a constant difference/percentage): (1) the rotation speed ω of the BLDC motor 202; (2) the temperature Tm of the BLDC motor 202; (3) the ambient temperature Te; (4) the input current Iin of the BLDC motor 202; and/or (5) the input voltage Vin of the BLDC motor 202. For another example, the predetermined parameter range corresponding to the from a characteristic curve of the rotation speed ω of the BLDC motor 202 versus one of the following parameters, wherein the range is expanding the curve by a constant difference/percentage: (1) the duty ratio D of the PWM signal Inp; (2) the temperature Tm of the BLDC motor 202; (3) the ambient temperature Te; (4) the input current Iin of the BLDC motor 202; and/or (5) the input voltage Vin of the BLDC motor 202. The above examples are given for illustration; other implementations are also practicable within the spirit of the present invention. FIG. 2B shows a characteristic curve of the rotation speed ω of the BLDC motor 202 versus the duty ratio D of the PWM signal Inp. An example is given by FIG. 2B, wherein the predetermined parameter range is a range of the rotation speed ω (boundaries are the maximum rotation speed (ωM) of the BLDC motor 202 and the minimum rotation speed (ωm) of the BLDC motor 202), which is obtained by expanding the characteristic curve of the rotation speed ω of the BLDC motor 202 versus the duty ratio D of the PWM signal Inp by a constant percentage. In yet another embodiment, the aforementioned predetermined parameter range can be obtained via a lookup table. In this case, such lookup table can be stored for example in the power stage circuit 2011 or the abnormality diagnosis circuit 2012.

As shown in FIG. 2B, when the duty ratio D of the PWM signal Inp is steady, if the rotation speed ω is smaller than the minimum rotation speed (ωm) or if the rotation speed ω is greater than the maximum rotation speed (ωM), the abnormality diagnosis circuit 2012 determines that the BLDC motor 202 is in a rotation abnormality condition, and the abnormality diagnosis circuit 2012 will issue an abnormality alarm signal Wn to the interface circuit 2015.

The power stage circuit 2011 provides operation currents Iu, Iv and Iw, which are supplied to the U-phase coil, the V-phase coil and the W-phase coil, respectively. The power stage circuit 2011 includes half-bridge power devices which operate to generate the operation currents. The half-bridge power devices include, for example, upper gate power devices Qh1, Qh2 and Qh3 and lower gate power devices Q11, Q12 and Q13. The upper gate power device Qh1 is connected in series to the lower gate power device Q11. The upper gate power device Qh2 is connected in series to the lower gate power device Q12. The upper gate power device Qh3 is connected in series to the lower gate power device Q13. The lower gate power devices Q11, Q12 and Q13 are commonly coupled to a resistor Rcs, wherein the resistor Rcs is coupled to a ground voltage level. The upper gate power devices Qh1, Qh2 and Qh3 are commonly coupled to an input voltage Vin. A node between the upper gate power device Qh1 and the lower gate power device Q11 is coupled to a phase inductor Lu; a node between the upper gate power device Qh2 and the lower gate power device Q12 is coupled to a phase inductor Lv; a node between the upper gate power device Qh3 and the lower gate power device Q13 is coupled to a phase inductor Lw.

The BLDC motor 202 includes: a phase inductor Lu and a phase resistor Ru of a U phase, a phase inductor Lv and a phase resistor Rv of a V phase, a phase inductor Lw and a phase resistor Rw of a W phase. The phase inductor Lu is connected in series to the phase resistor Ru. The phase inductor Lv is connected in series to the phase resistor Rv. The phase inductor Lw is connected in series to the phase resistor Rw. The phase resistor Ru, the phase resistor Rv and the phase resistor Rw are commonly coupled to a neutral node N.

Figure 3:
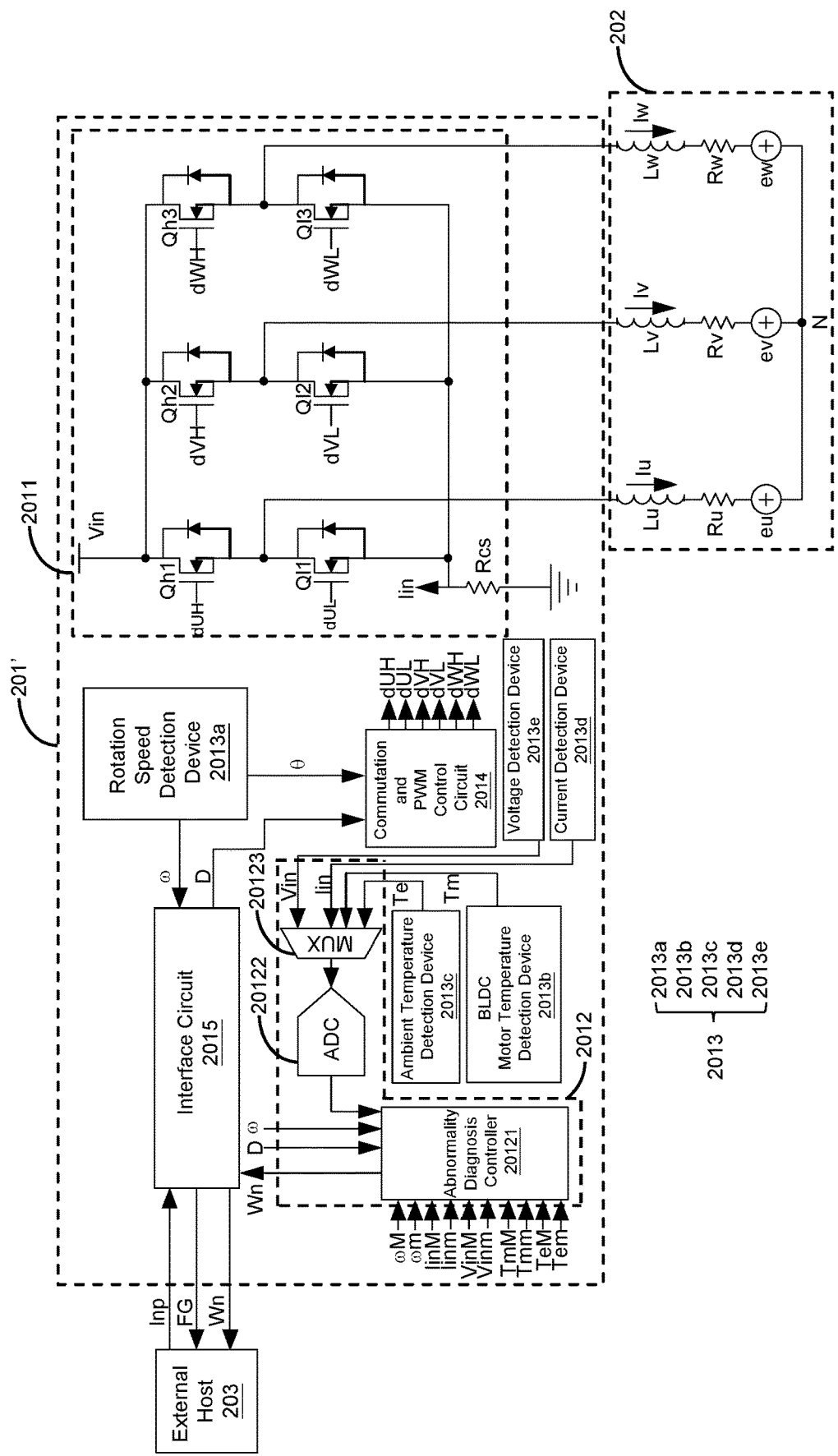
FIG. 3 shows a schematic circuit diagram of a BLDC motor driver circuit according to another embodiment of the present invention.

Please refer to FIG. 3, which shows a schematic circuit diagram of a BLDC motor driver circuit 201' according to another embodiment of the present invention. This embodiment shown in FIG. 3 is different from the embodiment shown in FIG. 2A in that: the abnormality diagnosis circuit 2012 of this embodiment includes an abnormality diagnosis controller 20121, an analog-to-digital converter (ADC) 20122 and a multiplexer (MUX) 20123. Besides, the BLDC motor driver circuit 201' of this embodiment further includes: a BLDC motor temperature detection device 2013b, an ambient temperature detection device 2013c, a current detection device 2013d and a voltage detection device 2013e. The rotation speed detection device 2013a, the BLDC motor temperature detection device 2013b, an ambient temperature detection device 2013c, the current detection device 2013d and the voltage detection device 2013e in combination can be regarded as the parameter detection device 2013. The power stage circuit 2011, the rotation speed detection device 2013a, the commutation and PWM control circuit 2014, the interface circuit 2015, the BLDC motor 202 and the external host 203 of this embodiment shown in FIG. 3 operate in a way similar to the power stage circuit 2011, the rotation speed detection device 2013a, the commutation and PWM control circuit 2014, the interface circuit 2015, the BLDC motor 202 and the external host 203 of the embodiment shown in FIG. 2A, so the details thereof are not redundantly explained here.

The BLDC motor temperature detection device 2013b is configured to operably detect the temperature Tm (which can be regarded as the motor temperature) of the BLDC motor 202, whereas, the ambient temperature detection device 2013c is configured to operably detect the ambient temperature Te; the ambient temperature Te, in this embodiment, is the temperature of a circuit board. The current detection device 2013d is configured to operably detect the input current Iin of the BLDC motor 202. The voltage detection device 2013e is configured to operably detect the input voltage Vin of the BLDC motor 202. The BLDC motor temperature detection device 2013b, the ambient temperature detection device 2013c, the current detection device 2013d and the voltage detection device 2013e are all coupled to input ends of the MUX 20123. An output end of the MUX 20123 is coupled to an input end of the ADC 20122. As a result, the ADC 20122 can convert one of the following information to a digital signal: the temperature Tm of the BLDC motor 202 detected by the BLDC motor temperature detection device 2013b; the ambient temperature Te detected by the ambient temperature detection device 2013c; the input current Iin of the BLDC motor 202 detected by the current detection device 2013d; or the input voltage Vin of the BLDC motor 202 detected by the voltage detection device 2013e. The generated digital signal is transmitted to the abnormality diagnosis controller 20121.

The abnormality diagnosis controller 20121 is configured to operably determine a rotation abnormality condition of the BLDC motor 202 according to the second parameter P2 in a case where the first parameter P1 is under control. Besides, the abnormality diagnosis controller 20121 can receive the rotation speed ω of the BLDC motor 202 and the duty ratio D of the PWM signal Inp from the interface circuit 2015. When the abnormality diagnosis controller 20121 determines that a rotation abnormality occurs in the BLDC motor 202, the abnormality diagnosis controller 20121 will issue an abnormality alarm signal Wn to the interface circuit 2015. In one embodiment, the first parameter P1 and the second parameter P2 are correlated with the rotation of the BLDC motor 202. In one embodiment, in a case where the first parameter P1 is controlled at a predetermined constant, the abnormality diagnosis controller 20121 is configured to operably determine the rotation abnormality condition of the BLDC motor 202 according to whether the second parameter P2 exceeds a predetermined parameter range. For details of how the abnormality diagnosis controller 20121 operates, please refer to the embodiment described with reference to FIG. 2A.

Figure 4:
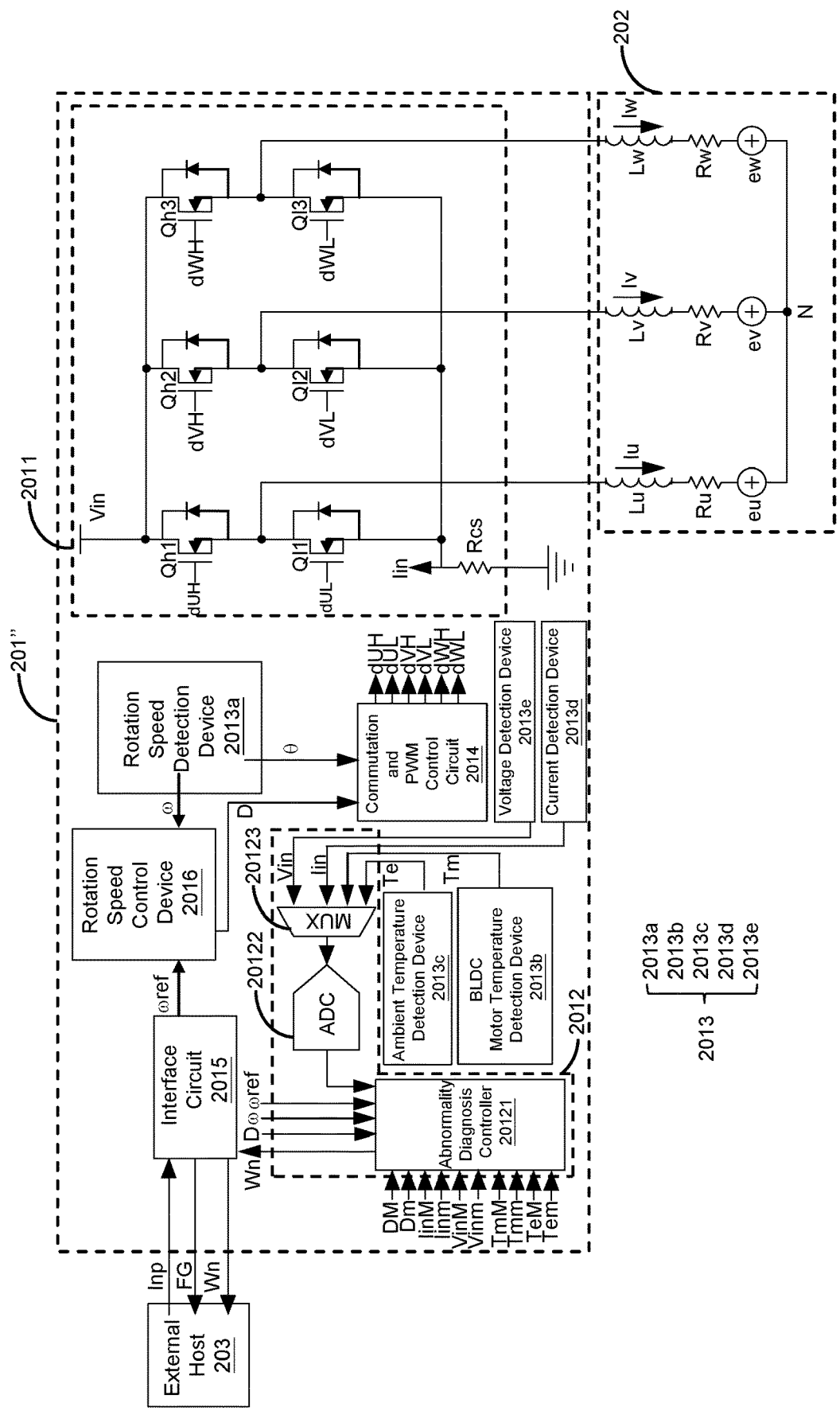
FIG. 4 shows a schematic circuit diagram of a BLDC motor driver circuit according to yet another embodiment of the present invention.

Please refer to FIG. 4, which shows a schematic circuit diagram of a BLDC motor driver circuit 201" according to yet another embodiment of the present invention. This embodiment shown in FIG. 4 is different from the embodiment shown in FIG. 3, in that: a BLDC motor driver circuit 201" of this embodiment further includes the rotation speed control device 2016. The power stage circuit 2011, the abnormality diagnosis circuit 2012, the parameter detection device 2013, the commutation and PWM control circuit 2014, the interface circuit 2015, the BLDC motor 202 and the external host 203 of this embodiment shown in FIG. 4 operates in a way similar to the power stage circuit 2011, the abnormality diagnosis circuit 2012, the parameter detection device 2013, the commutation and PWM control circuit 2014, the interface circuit 2015, the BLDC motor 202 and the external host 203 of the embodiment shown in FIG. 3, so the details thereof are not redundantly explained here.

The rotation speed control device 2016 is configured to operably control the rotation speed ω of the BLDC motor 202 to be a constant according to a reference rotation speed ω ref and the rotation speed ω of the BLDC motor 202 fed back by the rotation speed detection device 2013a. Besides, the rotation speed control device 2016 is configured to operably generate the duty ratio D of the PWM signal Inp according to a difference between the reference rotation speed ω ref and the rotation speed ω of the BLDC motor 202, and provide the duty ratio D of the PWM signal Inp to the commutation and PWM control circuit 2014. As a result, in a case where the first parameter P1 (e.g., the rotation speed ω of the BLDC motor 202) is controlled at a predetermined constant, the abnormality diagnosis controller 20121 determines the rotation abnormality condition of the BLDC motor 202 according to whether the second parameter P2 exceeds a predetermined parameter range, wherein the second parameter P2 includes for example but not limited to one and more of (1)-(5): (1) the duty ratio D of the PWM signal Inp, (2) the input current Iin of the BLDC motor 202, (3) the input voltage Vin of the BLDC motor 202, (4) the temperature Tm of the BLDC motor 202 and/or (5) the ambient temperature Te), and the predetermined parameter range is correspondingly, for example but not limited to, one of following as shown in FIG. 4: (1) a range between a minimum duty ratio Dm of the PWM signal Inp and a maximum duty ratio DM of the PWM signal Inp; (2) a range between a minimum input current Iinm of the BLDC motor 202 and a maximum input current IinM of the BLDC motor 202; (30) a range between a minimum input voltage Vinm of the BLDC motor 202 and a maximum input voltage VinM of the BLDC motor 202; (4) a range between a minimum temperature Tmm of the BLDC motor 202 and a maximum temperature TmM of the BLDC motor 202; (5) a range between a minimum ambient temperature Tem and a maximum ambient temperature TeM.

In another embodiment, it can be arranged to control one and more of (1)-(6) at a predetermined constant: (1) the duty ratio D of the PWM signal Inp; (2) the input current Iin of the BLDC motor 202; (3) the input voltage Vin of the BLDC motor 202; (4) the temperature Tm of the BLDC motor 202; (5) the ambient temperature Te and (6) the rotation speed ω of the BLDC motor 202, and the abnormality diagnosis controller 20121 can determine the rotation abnormality condition of the BLDC motor 202 according to whether the second parameter P2 exceeds a predetermined parameter range, wherein the second parameter P2 includes one or more of the parameters other than the parameters under control.

Figure 5:
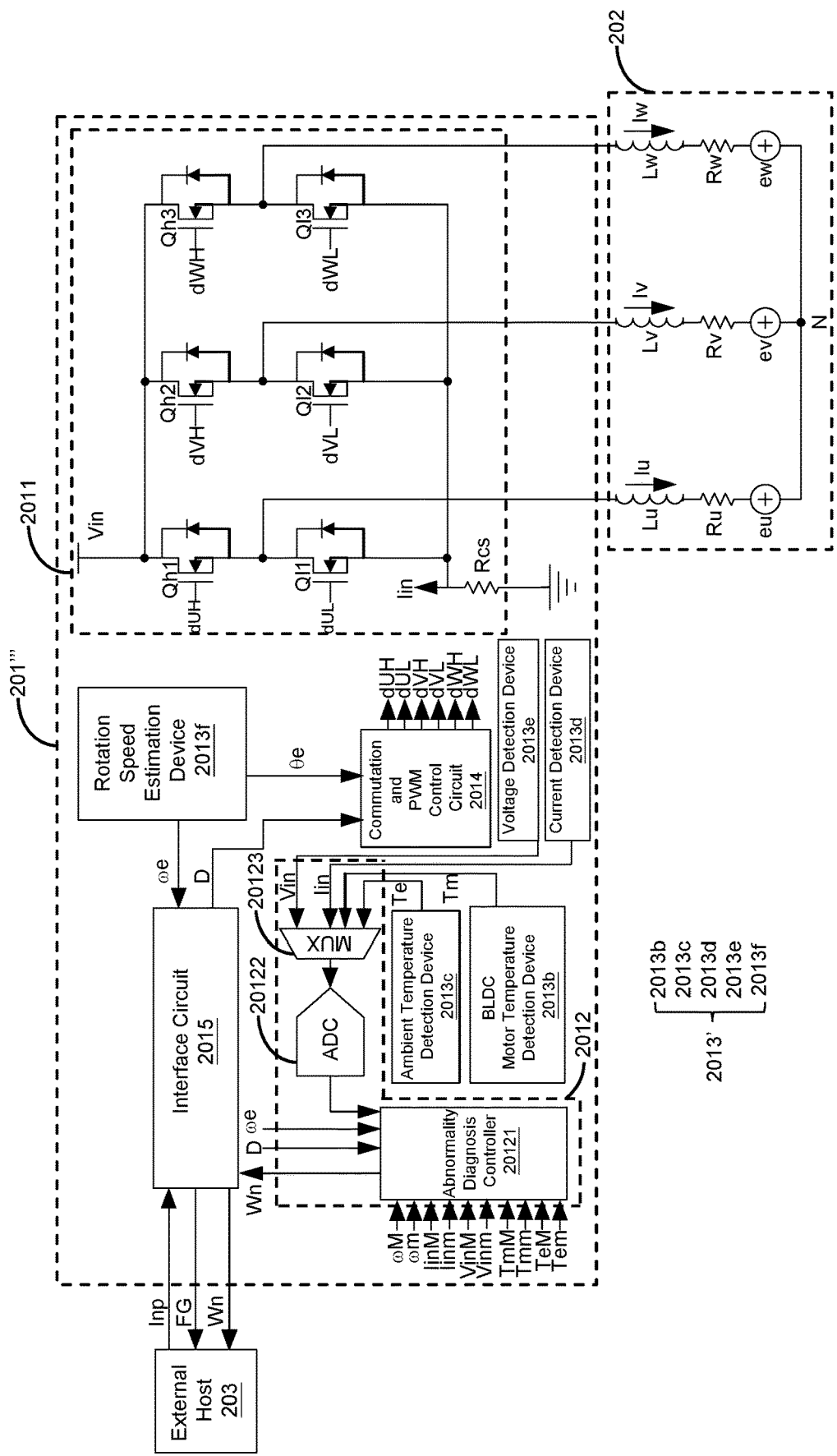
FIG. 5 shows a schematic circuit diagram of a BLDC motor driver circuit according to still another embodiment of the present invention.

Please refer to FIG. 5, which shows a schematic circuit diagram of a BLDC motor driver circuit 201''' according to still another embodiment of the present invention. This embodiment shown in FIG. 5 is configured to operably drive a BLDC motor 202 having no rotation speed sensor. This embodiment shown in FIG. 5 is different from the embodiment shown in FIG. 3, in that: a parameter detection device 2013' of a BLDC motor driver circuit 201''' of this embodiment shown in FIG. 5 includes a rotation speed estimation device 2013f. In this embodiment, the rotation speed estimation device 2013f is configured to operably estimate a rotation speed of the BLDC motor 202 and a rotor angle of the BLDC motor 202, and transmit the accordingly estimated rotation speed ω e of the BLDC motor 202 to the interface circuit 2015 and transmit the accordingly estimated rotor angle θe of the BLDC motor 202 to the commutation and PWM control circuit 2014. Because this embodiment employs a BLDC motor 202 having no rotation speed sensor, the rotation speed detection device 2013a is replaced by the rotation speed estimation device 2013f.

The power stage circuit 2011, the abnormality diagnosis circuit 2012, the BLDC motor temperature detection device 2013b, the ambient temperature detection device 2013c, the current detection device 2013d, the voltage detection device 2013e, the commutation and PWM control circuit 2014, the interface circuit 2015, the BLDC motor 202 and the external host 203 of this embodiment shown in FIG. 5 operate in a way similar to the power stage circuit 2011, the abnormality diagnosis circuit 2012, the BLDC motor temperature detection device 2013b, the ambient temperature detection device 2013c, the current detection device 2013d and the voltage detection device 2013e, the commutation and PWM control circuit 2014, the interface circuit 2015, the BLDC motor 202 and the external host 203 of the embodiment shown in FIG. 3, so the details thereof are not redundantly explained here.

As described above, advantages of the present invention include: that the present invention can diagnose whether a mechanical malfunction occurs in the BLDC motor by monitoring the duty ratio of the PWM signal, the rotation speed of the BLDC motor, the input current of the BLDC motor, the input voltage of the BLDC motor, the temperature of the BLDC motor and/or the ambient temperature; and that the present invention can issue an alarm or report an error concerning a condition of the BLDC motor to an external host.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A brushless DC electric (BLDC) motor driver circuit, comprising:
   a power stage circuit, which is configured to operably drive a BLDC motor according to a pulse width modulation (PWM) signal; and
   an abnormality diagnosis circuit, wherein when a first parameter is controlled at a predetermined constant in an open-loop manner, the abnormality diagnosis circuit is configured to operably determine a rotation abnormality condition of the BLDC motor according to whether a second parameter exceeds a predetermined range, wherein the second parameter is detected when the first parameter is functioning to activate the BLDC motor;
   wherein the first parameter and the second parameter are correlated with a rotation of the BLDC motor;
   wherein the first parameter includes a duty ratio of the PWM signal.

2. The BLDC motor driver circuit of claim 1, wherein the first parameter further includes an input voltage of the BLDC motor, whereas, the second parameter includes at least one of the following motor parameters:
   (1) a rotation speed of the BLDC motor;
   (2) a temperature of the BLDC motor;
   (3) the ambient temperature;
   (4) an input current of the BLDC motor; and/or
   (5) the input voltage of the BLDC motor;
   wherein the first parameter is different from the second parameter.

3. The BLDC motor driver circuit of claim 2, wherein the motor parameter is detected or estimated by a corresponding parameter detection device.

4. The BLDC motor driver circuit of claim 3, wherein the respective parameter detection device includes at least one of the following:
   (1) a rotation speed detection device, which is configured to operably detect the rotation speed of the BLDC motor;
   (2) a BLDC motor temperature detection device, which is configured to operably detect the temperature of the BLDC motor;
   (3) an ambient temperature detection device, which is configured to operably detect the ambient temperature;
   (4) a current detection device, which is configured to operably detect the input current of the BLDC motor;
   (5) a voltage detection device, which is configured to operably detect the input voltage of the BLDC motor; and/or
   (6) a rotation speed estimation device, which is configured to operably estimate the rotation speed of the BLDC motor.

5. The BLDC motor driver circuit of claim 2, further comprising:

a commutation and PWM control circuit, which is configured to operably generate the PWM signal according to a rotor angle and the duty ratio of the PWM signal.

6. The BLDC motor driver circuit of claim 5, further comprising:
a rotation speed control device, which is configured to operably generate the duty ratio of the PWM signal according to a difference between a reference rotation speed and the rotation speed of the BLDC motor.

7. The BLDC motor driver circuit of claim 2, wherein the first parameter is the duty ratio of the PWM signal, whereas, the second parameter is the rotation speed of the BLDC motor.

8. The BLDC motor driver circuit of claim 2, wherein the first parameter is the duty ratio of the PWM signal, whereas, the second parameter is the temperature of the BLDC motor and/or the ambient temperature.

9. The BLDC motor driver circuit of claim 2, wherein the first parameter is the input current of the BLDC motor, whereas, the second parameter is the rotation speed of the BLDC motor.

10. The BLDC motor driver circuit of claim 2, wherein the first parameter is the input current of the BLDC motor, whereas, the second parameter is the temperature of the BLDC motor and/or the ambient temperature.

11. The BLDC motor driver circuit of claim 1, wherein the predetermined parameter range corresponding to the second parameter is correlated with the another one of the motor parameters.

12. The BLDC motor driver circuit of claim 1, wherein when the first parameter is the rotation speed of the BLDC motor, the BLDC motor driver circuit further comprises: a rotation speed detection device and a rotation speed control device, wherein the rotation speed detection device is configured to operably detect the rotation speed of the BLDC motor, and wherein the rotation speed control device is configured to operably control the rotation speed of the BLDC motor to be a constant according to a reference rotation speed and the rotation speed of the BLDC motor fed back by the rotation speed detection device.

13. The BLDC motor driver circuit of claim 1, wherein the predetermined parameter range is stored in the power stage circuit or the abnormality diagnosis circuit, or wherein the predetermined parameter range is set via a plurality of external pins or an external host.

14. The BLDC motor driver circuit of claim 13, wherein the BLDC motor driver circuit is coupled to the external host via an interface, wherein the interface includes: a communication bus or a plurality of dedicated pins.

* * * * *